United States Patent [19]

Schultz et al.

[11] 3,987,227

[45] Oct. 19, 1976

[54] DURABLY STAIN-REPELLANT AND SOIL-RESISTANT PILE FABRIC AND PROCESS

[75] Inventors: William J. Schultz, White Bear Lake; Samuel Smith, Roseville, both of Minn.

[73] Assignee: Minnesota Mining and Manufacturing Company, Saint Paul, Minn.

[22] Filed: Nov. 6, 1974

[21] Appl. No.: 521,295

Related U.S. Application Data

[62] Division of Ser. No. 346,838, April 2, 1973, Pat. No. 3,896,035.

[52] U.S. Cl. .............................. 428/91; 428/421
[51] Int. Cl.$^2$ .................................. B32B 33/00
[58] Field of Search ..................... 161/62, 64, 67; 117/161 UA, 161 UH, 161 UN, 140 A; 260/29.2 TN, 77.5 AP, 77.5 MA, 858; 428/245, 265, 262, 289, 96, 421

[56] References Cited
UNITED STATES PATENTS

| | | |
|---|---|---|
| 3,463,761 | 8/1969 | Trischler et al. ............ 260/77.5 AP |
| 3,503,915 | 5/1970 | Peterson ...................... 117/161 UN |
| 3,544,663 | 12/1970 | Hauptschein et al. ........ 117/161 UH |
| 3,547,894 | 12/1970 | Smeltz ........................ 260/77.5 AP |
| 3,755,265 | 8/1973 | Fletcher et al. ............. 260/77.5 AP |
| 3,811,933 | 5/1974 | Uffner et al. ........................ 428/421 |
| 3,816,229 | 6/1974 | Bierbrauber ......................... 428/96 |
| 3,849,521 | 11/1974 | Kirimoto et al. ................ 117/140 A |
| 3,872,058 | 3/1975 | Gresham ..................... 260/77.5 AP |

*Primary Examiner*—Cameron K. Weiffenbach
*Attorney, Agent, or Firm*—Alexander, Sell, Steldt & DeLaHunt

[57] ABSTRACT

A durably soil-resistant pile fabric, such as a carpet, is provided which comprises a plurality of organic fibers having thereon a normally solid coating comprising (a) a first phase of a water-insoluble fluoroaliphatic radical free urethane adduct having at least one major transition temperature higher than about 45° C. and melting to a flowable liquid below about 200° C. and (b) a second phase of waterinsoluble fluoroaliphatic radical containing urethane adduct having at least one major transition temperature higher than about 45° C. and melting to a flowable liquid below about 200° C.

6 Claims, No Drawings

DURABLY STAIN-REPELLANT AND SOIL-RESISTANT PILE FABRIC AND PROCESS

This is a division of application Ser. No. 346,838 filed Apr. 2, 1973, now U.S. Pat. No. 3,896,035.

This invention relates generally to the treatment of pile fabrics, such as upholstery fabrics and carpets with a fluoraliphatic-radical-containing component and a component derived from reactants substantially free of fluorine to impart traffic-durable stain-repellent and soil-resistant properties thereto without significantly increasing the flammability of the fabric.

The treatment of various textile fabrics with fluorochemicals to impart water and oil repellency has been known to those in the art for several years. For example, various fluorochemical compounds have been heretofore disclosed for use on textile fabrics made from natural fibers alone, such as wool, cotton, silk, etc., and also for use on textile fabrics made from natural fibers alone or in combination with certain synthetic fibers, e.g., nylon, polyester and rayon. Various fluorochemicals have also frequently been used in conjunction with crease-resistant resins, hand modifiers, water repellents and the like to improve the fabric performance.

However, treatment with such fluorochemical compounds has not been useful or practical for all uses and has been especially impractical for treating fibers and fabrics which are subjected to severe abrasion during normal use. For example, the treatment of certain types of fibers, e.g., those of poly-(ethyleneterephthalate), with fluorochemical is often impractical because the fiber surface is not durably receptive to such fluorochemicals. Thus the fluorochemical may often be removed easily by abrasion, laundering, dry cleaning, etc. Moreover, conventional fluorochemical treatment of fibers and pile fabrics for carpet use has been quite impractical because, as a result of the severe abrasion to which such fibers and pile fabrics are subjected, the ability to resist soiling and staining is lost after a very short time.

It has been proposed by others, e.g., U.S. Pat. Nos. 3,068,187; 3,256,230; 3,256,231; 3,277,039, and 3,503,915, to mix fluorinated polymers with non-fluorinated polymers to obtain a mixture (in a water or solvent solution or dispersion) which will impart good water and oil repellency to textiles, paper and leather. As described in those references, by mixing a relatively inexpensive, non-fluorinated polymer with a fluoroaliphatic-containing polymer, one can obtain a relatively inexpensive textile fabric or fiber treating mixture which will impart water and oil repellency to the substrate. For economic reasons, those patents suggest using only a minor proportion of the fluoroaliphatic polymer in the mixture, i.e., the non-fluorinated polymer is primarily a diluent in the mixture.

Generally, attempts have been made by others with fluorochemical treatments to improve dry soil resistance of substrates, but such treatments have not been durable to severe abrasion. Also, treatments proposed by others which resist abrasion tend to be receptive to dry soil under conditions of high compressive load. More recently, it has become apparent that prior treatments significantly increase the flammability of fabrics particularly those fabrics having a face pile comprises principally of synthetic fibers.

In French Pat. No. 2,108,705 it is shown that a coating comprising a fluoroaliphatic-radical containing component having at least one major transition temperature above about 45° C. and a second phase comprising a fluoroaliphatic radical free vinylic polymer having at least one major transition temperature above about 45° C. provided durable soil and stain resistance even under pressure and abrasion.

From the copending application of C. J. Bierbrauer, Ser. No. 218,024, now U.S. Pat. No. 3,876,229, having a common assignee with the instant application it is known that more efficient and effective use is made of a soil-resistant coating on pile fabric if the soil-resistant coating is preceded by uniformly applied stain repellent coating on the fibers.

In accordance with this invention, there is provided a treated fabric comprising synthetic fibers having thereon a normally solid coating comprising (a) a first phase comprising a water-insoluble fluoroaliphatic radical containing urethane adduct containing fluoroaliphatic radical having at least three fully fluorinated carbon atoms and a terminal perfluoromethyl group, and (b) a second phase of a water-insoluble urethane adduct free from fluoroaliphatic radical, both adducts having at least one major transition temperature higher than about 45° C. and melting to flowable liquids at temperatures below about 200° C. and at least one of said adducts forming a continuous phase.

The invention also provides novel compositions for the treatment of carpets to impart traffic-durable soil-resistant and stain-repelling properties thereto. The compositions comprise at least 0.1% solids in a liquid medium, the solids comprising a water-insoluble component of fluoroaliphatic radical containing urethane adduct containing a fluoroaliphatic radical comprising at least three fully fluorinated carbon atoms and a terminal trifluoromethyl group together with a water-insoluble component, i.e., urethane adduct free from fluoroaliphatic radical; both adducts having at least one major thermal transition temperature higher than about 45° C. and melting to flowable liquids below about 200° C. Generally, the preferred concentration of polymers in the composition is about 1 – 25% solids, although much higher concentration, e.g., 50% or more may be useful depending upon the method used to treat the fibers or fabrics. Although for many purposes an aqueous medium is preferred, for certain purposes, e.g., treatment of velvet upholstery fabric, it is useful to employ non-aqueous solutions or dispersions. Such non-aqueous media include halogenated hydrocarbons such as $C_2F_3Cl_3$ and $CCl_3CH_3$.

More specifically, the adducts used are characterized as being normally non-rubbery (or curable to a non-rubbery state), non-tacky, normally solid, water-insoluble, and preferably free of ethylenic or acetylenic unsaturation. Water-insolubility is required to provide durability to the normal cleaning operations such as shampooing. In order to be resistant to soil under high compressive load, especially particulate soil, the adducts must have at least one major transition temperature above about 45° C. which is a melting point or glass transition temperature in which the polymer becomes significantly softer as the temperature is raised. Transitions are characteristically glass temperature ($T_g$) or crystalline melting points ($T_m$), such as are usually detected by DTA (differential thermal analysis) or thermo-mechanical analysis (TMA). While suitable materials may have, for example, glass transitions at relatively low temperatures, such as −25° C. to 0° C., the adducts must have at least one major transition point above about 45° C.

As emphasized above, it is critical that the adducts must melt to flowable liquids below about 200° C. Likewise any adjuvants which may be added must melt to flowable liquid below about 200° C. A flowable liquid is considered to be one which has a viscosity of not over about 200,000 centipoises. Materials which char on burning and additives which prevent flow, for example, inert fillers, are not operable. It is believed, without wishing to be bound by the theory, that melting and flowing below about 200° C. is necessary to allow flow of molten polymer of the fabric, which is believed to decrease the tendency toward burning during tests or practically.

The fluorinated aliphatic radical $R_f$ is a fluorinated, preferably saturated, monovalent, non-aromatic, aliphatic radical of at least three carbon atoms. The chain may be straight, branched, or if sufficiently large, cyclic, and may be interrupted by divalent oxygen atoms or trivalent nitrogen atoms bonded only to carbon atoms. It will be recognized by those skilled in the art that such oxygen or nitrogen atoms are chemically screened or masked in the shelter of fully fluorinated carbon atoms. A fully fluorinated group is preferred, but hydrogen or chlorine atoms may be present as substituents in the fluorinated aliphatic radical provided that not more than one atom of either is present in the radical for every two carbon atoms, and that the radical must at least contain a terminal perfluoromethyl group. "Terminal" in the case of a polymer refers to the position in the skeletal chain of the radical furthest removed from the backbone chain. Preferably, the fluorinated aliphatic radical contains not more than 20 carbon atoms because such a large radical results in inefficient use of the fluorine content. The fluoroaliphatic radical containing urethane is the reaction product of an isocyanate with a fluoroaliphatic radical-containing molecule having one or two isocyanate-reactive hydroxyl groups. The hydroxyl group may be primary, secondary, or less preferably, tertiary and is otherwise free of isocyanate reactive groups. The isocyanate-containing reactant may have one or more isocyanate groups which can be attached to an aliphatic (including cycloaliphatic) or aromatic carbon atom. The exact structure and composition of the resulting polyurethane is relatively unimportant, as is the particular molecular weight, which may range from dimer to polymeric polyurethanes having molecular weights up to several hundred thousand or more. The critical requirements are only that the material contain at least 30 percent, preferably at least 40 percent by weight of carbon-bonded fluorine in the form of fluoroaliphatic radical, that the melting point of the material be above 45° C. and that the material melt to a fluid liquid at temperatures below about 200° C.

Representative fluoroaliphatic reactants for use in forming suitable fluoroaliphatic radical containing urethane adducts include:

$C_8F_{17}SO_2N(CH_3)CH_2-CHOH-CH_2OH$ $C_8F_{17}SO_2N(CH_2CH_2OH)_2$ $C_8F_{17}SO_2N(CH_2CH_2SH)_2$ $C_8F_{17}CH_2CH_2OH$ $C_8F_{17}SO_2N(CH_3)CH_2CH_2OH$ $C_8F_{17}SO_2N(CH_3)C_{10}H_{20}CH_2OH$ $C_7F_{15}CON(C_2H_5)CH_2CH_2OH$ $CF_3C_6F_{10}SO_2N(C_2H_5)CH_2CH_2OH$ $C_3F_7O(C_3F_6O)_2CF_2CON(CH_3)C_3H_6OH$ $CF_3CF(CF_2H)(CF_2CF_2)_3CF_2CH_2OH$ $C_8F_{17}SO_2N(C_4H_9)CH_2CHOHCH_2OH$

Members of each series wherein the fluorinated group is from $C_3F_7$ to about $C_{20}F_{41}$ are also suitable without the extended enumeration of each.

The above materials are modified, for example, by converting a diol to the diisocyanate, i.e., for the first member of the above tabulation the adduct obtained is represented by the formula:

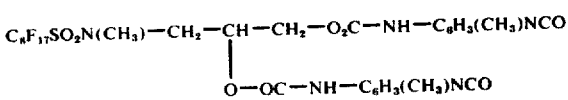

Those of skill in the art will recognize that mono-ols can be reacted with diisocyanate to give mono isocyanates or bis-urethanes.

Fluorinated compounds which are employed in the invention include as particular examples fluoroaliphatic group containing urethanes as described in U.S. Pat. No. 3,484,281 having melting points above 45° C. and usually up to about 200° C. such as

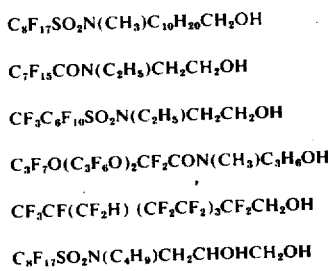

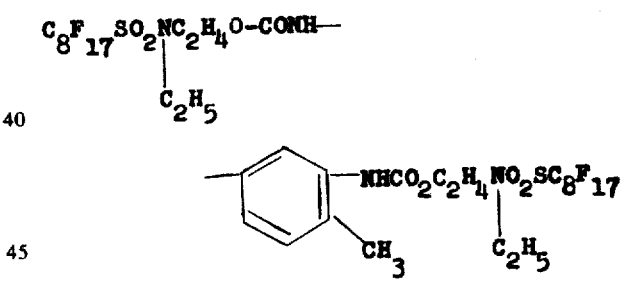

The fluorine free urethane is prepared by conventional means from the same type of isocyanate compounds used above and from an alcohol or a diol containing primary, secondary or, less preferably, tertiary alcohol and containing one to about twenty-five carbon atoms, free of other isocyanate-reactive groups, containing less than 10 percent by weight of halogen, hydrolytically stable. The composition may be a one-to-one hydroxyl-isocyanate urethane, or may contain a multiplicity of units in the form of a polymeric polyurethane substantially free of crosslinks, having a melting point above about 45° C. and melting to a flowable liquid at a temperature below about 200° C.

It has been found that both the fluorinated component and the fluorine free urethane employed must be non-tacky and not-rubbery in order to prevent soil, especially particulate soil, from becoming embedded in the coating formed by these polymers. It will be recognized that fluorinated urethanes, as herein used, also possess these characteristics.

It has been found that the fluorinated urethane adduct and the fluorine free adduct are sufficiently immiscible in, or incompatible with, each other, that two phases are always formed when these polymers are applied to a substrate, one of the phases comprises the fluorinated component and the other phase comprises the fluorine free adduct. Additionally, at least one of the phases is a continuous phase. Without being bound by a particular theory, it is believed that a coating, e.g., on a fiber, comprising the fluorinated component and the fluorine-free polymer may contain, for example, a continuous phase of the fluorinated component while the other is a discontinuous phase of particles dispersed throughout the continuous phase. Applicants also believe that there may be two continuous phases, wherein the fluorine free adduct forms a film on the substrate, e.g., a fiber, overlain by the fluorinated component or the two may form intergrown networks.

It is preferred that there be a first coating of fluoroaliphatic-radical containing urethane applied to the substrate at 0.05 to 0.2% by weight to face pile fiber (w.f.p.f.) followed by a top coating consisting essentially of a fluorine free urethane together with the same or a different fluoroaliphatic radical-containing component in proportions of from about 1:1.5 up to about 4:1 at a combined treating weight of 0.1 to 0.4% wfpf. The top coating should provide at least about 0.02 percent by weight of carbon-bonded fluorine based on the weight of the face pile fiber.

In treatments of carpet with the procedure of this invention, it is preferred that a preliminary treatment of e.g. the carpet with the fluoroaliphatic radical-containing urethane adduct be made, because this allows efficient use of the secondary treatment by effectively restricting the treatment to the distal portion of the carpet face pile fibers and particularly the distal 25%. The top spray treatment must consist of a mixture of the fluorinated and non-fluorinated adduct. The presence of the initial fluorinated adduct coating provides oil repellency and stain resistance to the total fibre, minimizing travel or migration of soil or staining material to the carpet backing, from which it is very difficult to remove. The non-fluorinated component of the topcoating provides resistance to ground-in soil, while the fluorine-containing component provides primarily stain resistance. While the ratio of the two components is not critical, if the ratio of non-fluorinated to fluorinated is less than about 1:1.75, the dry soil resistance is generally less than desirable. If the ratio is greater than about four to one, excessive amounts of top spray must be used to provide adequate stain resistance, because the minimum amount of fluoroaliphatic radical-containing adduct on the fiber in the form of top spray must contribute at least about 0.02 percent by weight of carbon-bonded fluorine of the weight of the face pile fiber. Preferably the ratio of fluorine-free to fluoroaliphatic radical-containing adduct is between about 1.5:1 to 4:1.

The top spray solution can be prepared by adding to water a sufficient quantity of fluoroaliphatic radical-containing adduct in the form of a concentrate to provide 1 percent solids of the adduct, and then adding sufficient quantity of a concentrate of the fluorine-free adduct to provide about 2 percent by weight of adduct solids. Alternatively, and more conveniently, the two adduct concentrates may be mixed in such quantities that the ratio of the fluorine-free to fluorine containing adduct solids is between about 1.5:1 and 4:1. Such a concentrate is a useful commercial embodiment of the invention. This concentrate is diluted with water to provide a suitable concentration for application to carpets.

The four types of carpet which are employed in the following tests are designated by the following abbreviations:

| cut pile acrylic | CPA |
| loop pile acrylic | LPA |
| cut pile nylon | CPN |
| loop pile nylon | LPN |

The method of treatment is to prepad (100% wet pick up) with an aqueous dispersion of 0.1% by weight of solids of the first coating composition conveniently by applying an excess suitably by dipping and then passing through a squeeze roll to remove the excess. This pretreated or prepadded sample is then dried at 125° C. and allowed to cool to room temperature before the second coating is applied, preferably by spraying, to about 25% wet pick up or at least an amount sufficient to provide at least 0.02% by weight of carbon-bonded fluorine in the weight of the face pile fiber. Treated carpet is again dried, allowed to cool and evaluated for soil resistance by the "walk-on" test, (AATCC122-1967 T), water repellency by the "AQ" test, oil repellency (AATCC 118-1966 T), and flammability (DOC FF 1-70) both before and after shampooing with a commercial carpet shampoo.

The AQ test consists in determining whether a drop of 80:20 water: isopropanol is absorbed (fail) or not (pass). All samples described herein passed the test before shampooing and failed afterwards. This is believed the result of retention of a residual film of the shampoo under the conditions used.

The results of the walk-on test were rated visually on a scale of −8 to +8 after 10,000 footsteps and both before and after shampooing.

| Rating | Significance |
| --- | --- |
| −8 | No soil resistance; carpet completely black with soil. |
| 0 | Almost no soil resistance; same amount of soil as retained by untreated control. |
| +2 | Fair soil resistance. |
| +4 | Good soil resistance. |
| +6 | Excellent soil resistance. |
| +8 | Completely unsoiled carpet. |

The standard test for flammability, DOC FF 1-70 is carried out by first conditioning 8 samples approximately 9 inches (23 cm.) square with the particular treatment by first drying for 2 hours at 105° C. and then placing in a drying cabinet at room temperature for at least 1 hour. Each specimen in turn is then subjected to the actual burning test by first placing on it in a draft free area a 0.25 inch (6.3 ™m.) thick metal mask of the same outline 9 inch (23 cm.) square as the sample and with a central circular hole 8 inches (20 cm.) in diameter and then placing a time burning tablet of about 0.149 g. hexamethylene tetramine in the center of the hole and igniting it. Burning will spread from the center point depending on flammability. Passing the test for a treated carpet requires that the charred area in each specimen tested must not come within 1 inch (2.5 cm.) of the edge of the metal mask in more than one of the eight samples tested. A more rigorous test may involve a greater number of samples with a smaller percentage being permitted to burn to within 1 inch (2.5 cm.) of the edge of the mask.

The American Association of Textile Chemists and Colorists (AATCC) tests for oil repellency (118-1966T) and the walk-on test (122-1967T) are well-known and are incorporated by reference.

The invention is now more specifically illustrated by examples showing the best mode presently contemplated for practicing the invention. In these samples, parts are by weight for solids and by volume for liquids and temperatures are in degrees Centigrade where not otherwise specified.

EXAMPLE 1

A bis-urethane fluoroaliphatic-radical-containing adduct is prepared from 554 parts of N-ethyl perfluorooctanesulfonamidoethanol. A solution of this alcohol in 337 parts of methyl isobutyl ketone is freed from water by distilling to remove 100 parts of solvent and is then cooled to 80° C. To this solution are added 0.32 parts by dibutyltin dilaurate and then very slowly 87 parts of 2,4-tolylene diisocyanate as the exothermic reaction permits. After reaction, an emulsion is prepared in a dispersion of 489 parts of water containing a solution of 16 parts of fluoroaliphatic surfactant,

$C_8F_{17}SO_2NHC_3H_6N^+(CH_3)_3Cl^-$.

in 16 parts acetone and 48 parts water and 16 parts of polyoxyethylene sorbitan monooleate (Tween 80) by putting the total dispersion through an homogenizer (Manton Gaulin) at 2500 pounds per square inch and 75° C. The 45% solid-content emulsion is designated Adduct D. The solid has a melting point of 110° – 125° C.

Other fluoroaliphatic radical-containing adducts made as described above and which can be used in carpet treatments according to the invention include the following:

| | |
|---|---|
| $(C_8F_{17}SO_2N(C_2H_5)C_2H_4OCONH)_2 C_6H_3CH_3$ | m.p. 110 |
| $(C_8F_{17}SO_2N(CH_3)C_2H_4OCONH)_2 C_6H_3CH_3$ | m.p. 185° |
| $(C_8F_{17}SO_2N(C_2H_5)C_2H_4OCONHC_6H_4)_2 CH_2$ | m.p. 125 |
| $(C_{10}F_{21}SO_2N(C_3H_7)C_2H_4OCONH)_2 C_6H_3CH_3$ | m.p. 70° |
| $C_8F_{17}SO_2N(CH_3)C_2H_4OCONH\ C_6H_3(CH_3)\ NHCO_2CH_3$ | m.p. 152 |
| $C_8F_{17}SO_2N(C_2H_5)C_2H_4OCONH\ C_6H_3(CH_3)$- NHCONC$_4$H$_9$ | m.p. 95° |
| $C_8F_{17}SO_2N(C_2H_5)C_2H_4OCONHC_6H_3(CH_3)NHCO_2CH_3$ | m.p. 86 |
| $(C_8F_{17}SO_2N(C_2H_5)C_2H_4OCONHCH_2CH_2CH_2)_2$ | m.p. 150° |
| $(C_7F_{15}CONHC_2H_4OCONH)_2C_6H_3\ CH_3$ | m.p. 132° |

The emulsion of Adduct D above is used as a first coating by diluting to 0.1% solution (weight/volume) with water. Carpet is prepadded to 100% wet pickup as noted above and dried at 125° C.

Fluorine-free urethane adducts are prepared by premixing the desired alcohols with methyl isobutyl ketone as solvent and dibutyltin dilaurate as catalyst and the diisocyanate is added gradually over about 1½ hours maintaining the temperature at 80° for a further 4 hours. Water dispersions are prepared by dilution with water containing surfactant in a Eppenbach homomixer.

Two non-fluorinated urethane adducts are prepared and emulsified using the reactants tabulated below. Numerous other such non-fluorinated urethane adducts melting to flowable liquids between 45° C. and about 200° C. are known and when produced by this or other procedures can be employed in carpet treatment according to this invention.

| Preparation | Adduct A | Adduct C |
|---|---|---|
| n-butanol | 74 g. | — |
| ethylene glycol | 31 g. | — |
| 2,4-toluene diisocyanate | 174 g. | — |
| methyl isobutyl ketone | 103 g. | 79 g. |
| dibutyltin dilaurate | 0.140 g. | 0.107 g. |
| polyaromatic diisocyanate | | 154 g. |
| isopropyl alcohol | — | 60 g. |
| melting point of adduct | 65° C. | 90° C. |
| Emulsification | | |
| water | 240 g. | 183 g. |
| Tween 80 (a) | 7.2 g. | 5.3 g. |
| Ethoquad 18/25 (b) | 7.2 g. | 5.3 g. |

(a) Trade name for polyoxyethylene sorbitan monooleate
(b) Trade name for polyethoxylated quaternary ammonium chloride.

Carpets of various types are prepadded by first padding to 0.1% by weight of face pile fiber (w.f.p.f.) with fluoroaliphatic urethane Adduct D, and then topcoated with combinations of A plus D and C plus D in the proportions of 2 to 1 respectively of the concentrates by volume, the diluted dispersion containing 3% by weight of urethane solids, and applied by spray to 25% wfpf wet pickup. The carpets employed are cut pile acrylic, loop pile acrylic, cut pile nylon and loop pile nylon as described above together with loop pile polyester (LPP) and polyester shag (PS). The flammability was tested by the procedure described above and they showed no enhanced flammability after testing 24 times. All passed the AQ test for water repellency before shampooing and failed afterwards. Oil repellency and walk-on tests (10,000 footsteps) are summarized in the following table.

| Type Carpet | Fluorine Free Adduct | Before Shampooing | | After Shampooing |
|---|---|---|---|---|
| | | oil | walk on | walk on |
| LPN | A | 5 | 5 | 4 |
| CPN | A | 4 | 4 | 4 |
| LPA | A | 5 | 4 | 4 |
| CPA | A | 4 | 4 | 4 |
| LPP | A | 6 | 5 | 4 |
| LPN | C | 5 | 4 | 4 |
| CPN | C | 4 | 4 | 4 |
| LPA | C | 5 | 5 | 4 |
| CPA | C | 4 | 4 | 4 |
| LPP | C | 6 | 5 | 5 |

In contrast to the above, a prepad using a copolymer of $C_8F_{17}SO_2N(CH_3)C_2H_4O_2CCH=CH_2$ and butyl acrylate in 90:10 proportions followed by top spraying with the combination of adducts A and D gives carpets with increased flammability (2 out of 8 tests fail). This copolymer softens at about 125° C. and chars to a brittle solid at higher temperatures.

Failure in flammability tests is also found when this copolymer is employed in the top spray at 1% concentration in place of Adduct D. Use of a fluorine-free copolymer (in place of Adduct A) in vinylidene chloride, methyl acrylate and itaconic acid, which decomposes to a hard char at 200°, gave 8 failures out of 8 tests. Addition of aluminum oxide monohydrate to a top spray using Adducts A and D on carpet prepadded with Adduct D provides good stain and soil resistance, but failure in the flammability test in 3 out of 8 samples.

On the basis of these tests, it is concluded that melting to a flowable liquid below about 200° C. is a necessary characteristic of each of the components of the carpet treatment.

What is claimed is:

1. A durably stain-repellent and soil-resistant pile fabric having on the pile fibers thereof a coating consisting essentially of the combination of water-insoluble fluoroaliphatic-radical containing urethane adduct and water-insoluble urethane adduct free from fluoroaliphatic radicals, each said adduct becoming a flowable liquid above 45° C. and below about 200° C.

2. A durably stain-repellent and soil-resistant pile fabric according to claim 1 which is a carpet having a pile of synthetic fibers.

3. A durably stain-repellent and soil-resistant pile fabric according to claim 1 having on the pile fibers thereof a coating consisting essentially of the combination of water-insoluble fluoroaliphatic-radical containing urethane adduct and water-insoluble urethane adduct free from fluoroaliphatic radicals, each said adduct having at least one major transition temperature higher than about 45° C. and melting to a flowable liquid at temperatures below about 200° C., at least one of said adducts forming a continuous phase.

4. A durably stain-repellent and soil-resistant pile fabric according to claim 1 which is a carpet having a pile of synthetic fibers in which the coating consists of a first coating of fluoroaliphatic-radical containing urethane adduct over the pile and a second coating partially over said first coating and restricted to the distal portion of the face pile fibers of the carpet, said second coating consisting of fluoroaliphatic radical containing urethane adduct and fluoroaliphatic radical free urethane adduct, each said adduct melting to a flowable liquid above 45° C. and below about 200° C.

5. A durably stain-repellent and soil-resistant pile fabric according to Claim 3 wherein each fluoroaliphatic radical containing urethane adduct is $(C_8F_{17}SO_2NRC_2H_4OCONH)_2C_6H_3CH_3$ in which R is alkyl of 1 to 3 carbon atoms.

6. A process for rendering a synthetic pile fabric stain-repellent and soil-resistant without enhancing the flammability thereof which comprises the step of applying to said fabric, in an amount sufficient to provide at least 0.02% by weight of carbon-bonded fluorine on the weight of the face pile fibre, a dispersion at a concentration of from 0.02 to about 25% by weight solids of the combination of fluoroaliphatic radical-containing urethane adduct and fluoroaliphatic radical free urethane adduct in proportions of from about 1:1.5 to about 4:1, each of said adducts melting to a flowable liquid at above 45° C. and below about 200° C.

* * * * *